Feb. 17, 1942.                A. HAYNER                2,273,354
            METHOD OF MANUFACTURING FIBER FASTENING MATERIAL
                   Filed June 28, 1940        3 Sheets-Sheet 1
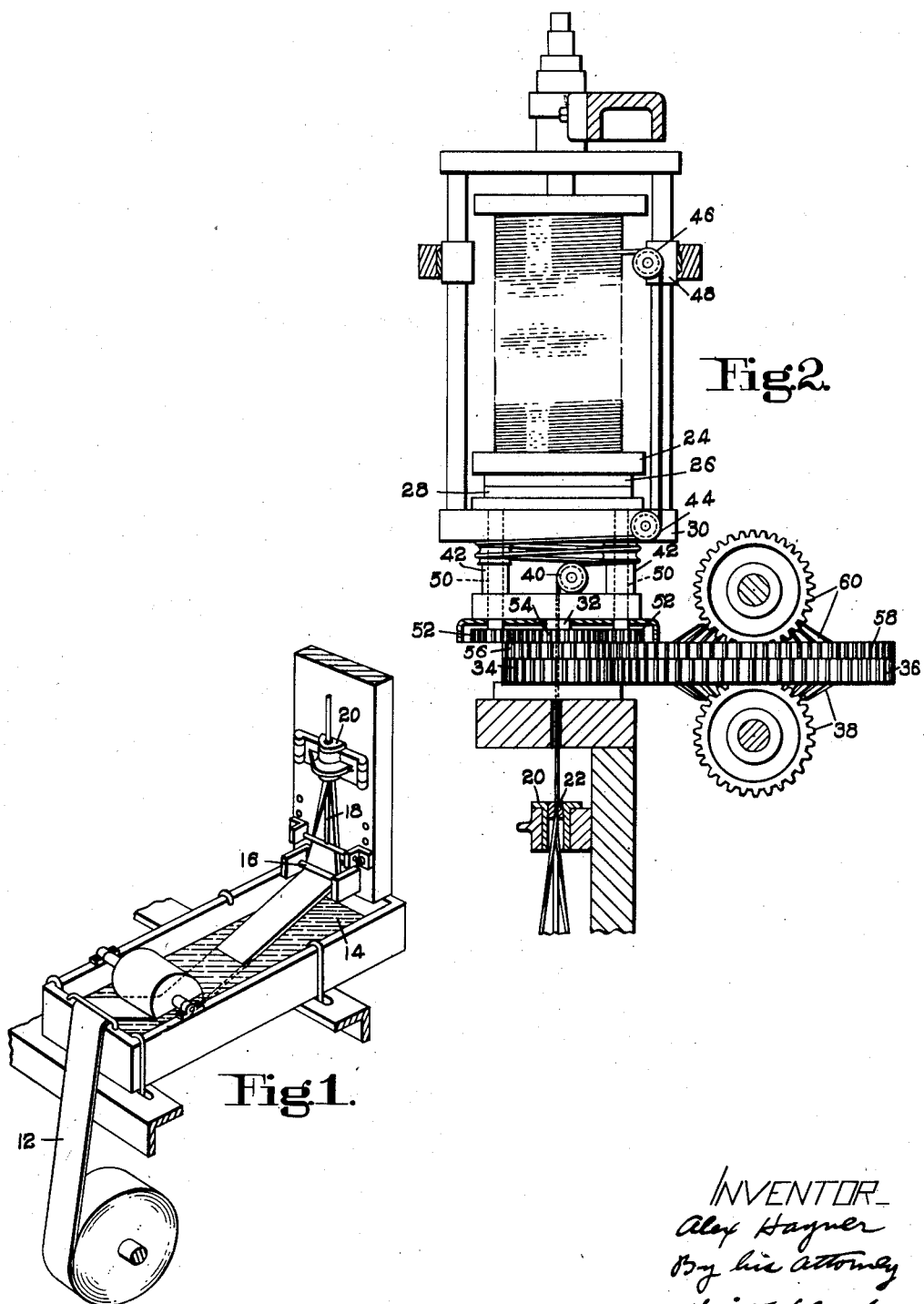
INVENTOR_
Alex Hayner
By his attorney
Victor Cobb Feb. 17, 1942.  A. HAYNER  2,273,354
METHOD OF MANUFACTURING FIBER FASTENING MATERIAL
Filed June 28, 1940   3 Sheets-Sheet 2
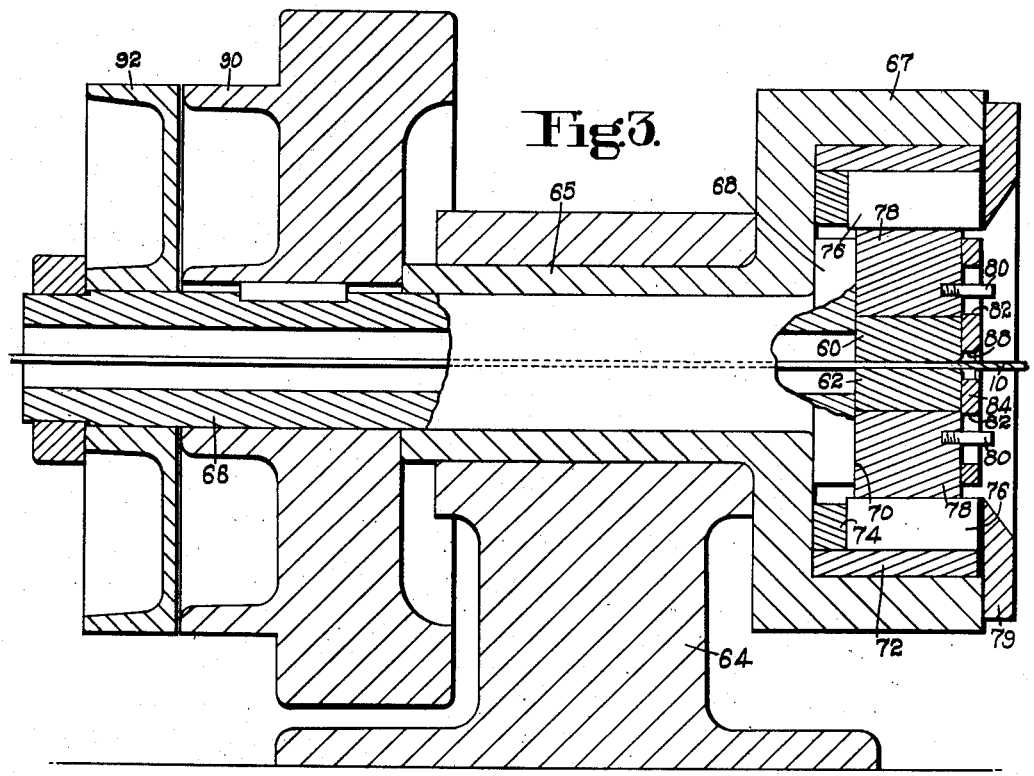
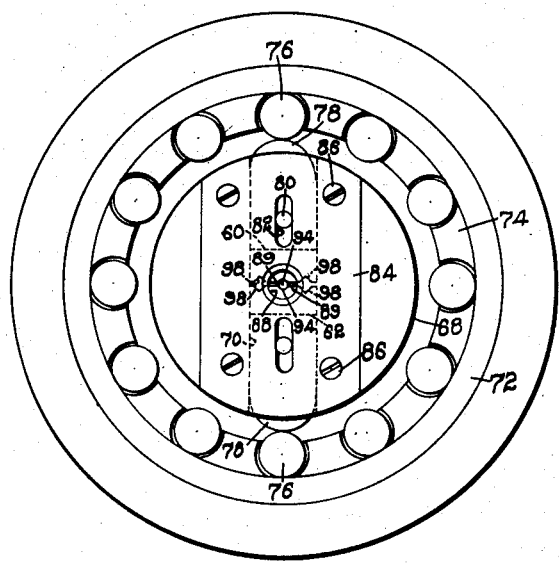
INVENTOR_
Alex Hayner
By his Attorney
Victor Gobl.

Feb. 17, 1942.  A. HAYNER  2,273,354
METHOD OF MANUFACTURING FIBER FASTENING MATERIAL
Filed June 28, 1940  3 Sheets-Sheet 3
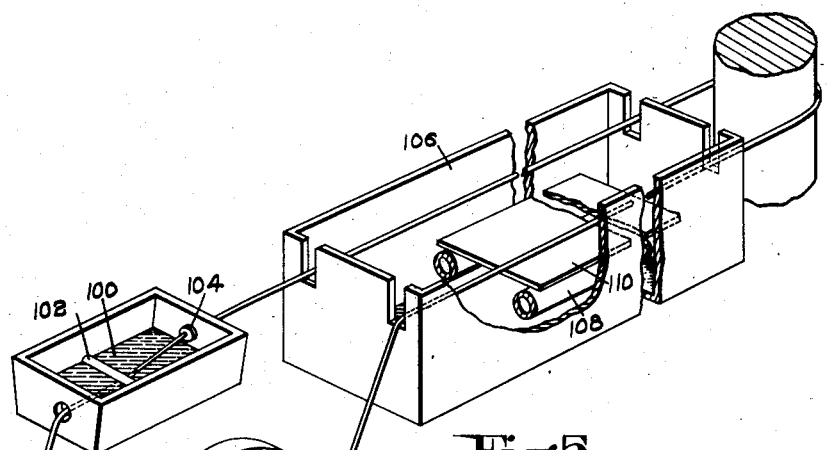
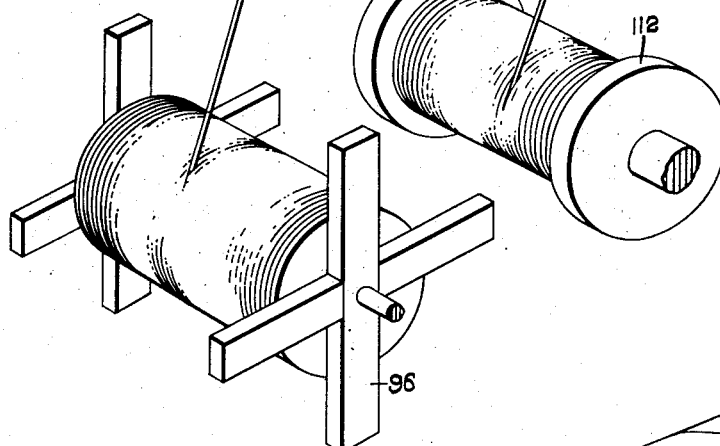
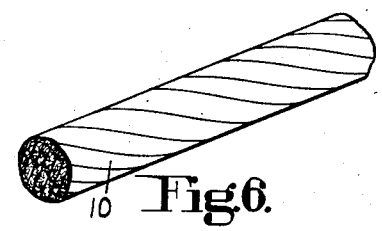
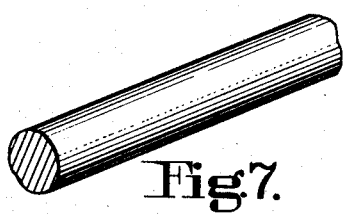

Patented Feb. 17, 1942

2,273,354

UNITED STATES PATENT OFFICE 2,273,354

METHOD OF MANUFACTURING FIBER FASTENING MATERIAL

Alex Hayner, Boston, Mass., assignor to United Shoe Machinery Corporation, Boston, Mass., a corporation of New Jersey Application June 28, 1940, Serial No. 343,007

7 Claims. (Cl. 57—154)

This invention relates to the manufacture of fastening material and is herein illustrated with reference to an improved method of making hard, felted, fibrous material for use in making fastenings of the character disclosed in Letters Patent of the United States No. 1,729,169, granted September 24, 1929, upon an application of F. N. LaChapelle.

Felted, fibrous material, such as paper, has been utilized for some years as material from which to form fastenings for securing together work pieces, such as shoe parts, the fastenings usually being inserted by machines having instrumentalities for handling fastening material of a predetermined size. Accordingly, the fastening material should be not only hard enough to withstand, without buckling, the force applied to it in the fastening-inserting operation but should be uniform as to diameter and cross-section to facilitate its use by such machines.

It is an object of the present invention to provide an improved method of manufacturing fiber fastening material by the use of which harder and stronger material may be produced than heretofore with greater accuracy and more uniformity as to diameter and cross-section. In one important aspect the present invention provides an improvement in methods of manufacturing such material, especially in respect to the manner of shaping and hardening the material. In accordance with the novel method of this invention, the fastening material in twisted form is first produced from a strip of sized, felted, fibrous material, such as paper, after which it is hardened and condensed and made uniform in diameter and cross-section by subjecting it to a rapid succession of hammer blows. More particularly, in accordance with the illustrated practice, the twisted fastening material produced by passing a strip of sized paper through a die and twisting the strip into an approximately cylindrical form is allowed to dry and is then passed between a pair of dies, each of which is provided with a semi-cylindrical recess of less diameter than the diameter of the twisted fastening material. The dies are rotated about the longitudinal axis of the twisted material and are reciprocated rapidly to impart a large number of successive blows to the material to condense it or reduce its diameter and to compact and compress the material. The fastening material thus produced is accurate as to size, is uniform in cross-section, and is harder and stronger than any heretofore produced. The action of the dies, moreover, smooths and polishes the surface of the material, and this surface may be preserved, as herein illustrated, by applying to it a coating of sizing which acts still further to stiffen the material, any surplus sizing being removed from the surface of the material before the sizing hardens. The finished material is then dried before being reeled or coiled for shipment.

In another aspect the invention comprises a new article of manufacture for use as driven fastenings in securing work pieces together consisting of a strip of sized paper twisted into an approximately cylindrical form and compacted and shaped into substantially solid material in cross-section by hammering. Such hardened material reduced to the required diameter is superior in quality to any heretofore produced and is particularly well adapted for use as material from which to make fastenings of the character disclosed in the previously mentioned Letters Patent, although it will be understood that the invention, in its more general aspects, is not thus limited in use, since the material produced is capable of a wide variety of uses.

The invention will now be more particularly described by reference to the accompanying drawings and thereafter pointed out in the claims.

In the drawings,

Fig. 1 illustrates the passing of a strip of paper through a bath of sizing and then through a die in the manufacture of fiber fastening material;

Fig. 2 illustrates the steps of twisting the strip of paper and reeling it after it passes from the die of Fig. 1;

Fig. 3 illustrates the step of shaping and hardening the twisted fiber fastening material by the use of a well-known swaging machine of the rotary type;

Fig. 4 is a view in front elevation of the head of the machine shown in Fig. 3;

Fig. 5 illustrates the application of a surface coating of sizing to the hardened fiber fastening material, and the subsequent drying of the material;

Fig. 6 shows the fiber fastening material after it has been twisted into an approximately cylindrical form and before being shaped and hardened; and Fig. 7 shows the fiber fastening material after it has been shaped and hardened and a coating of sizing has been applied to the surface of the material.

As illustrated in the drawings, the twisted, felted, fibrous material 10 (Fig. 6) is produced from a strip of paper 12 (Fig. 1) preferably impregnated with glue and twisted in the manner disclosed in United States Letters Patent No. 1,837,433, granted December 23, 1931, upon an application of mine. As fully described in said prior Letters Patent, the strip 12 of paper is passed through a bath 14 of glue from which it is guided by a rod 16 toward a vertical rod 18 about which the strip is curled and along which the curled strip is guided through a die 20 provided with a passage 22 (Fig. 2) which tapers somewhat from its entering end to assist in compressing the partially formed fastening material. From the die 20 the partially formed fastening material is fed to mechanism which imparts to it the desired twist and which winds it upon a spool 24. This mechanism is substantially like that fully shown and described in my above-mentioned Letters Patent and comprises a plate 26 on which the spool 24 rests and which, in turn, rests on a second plate 28 carried by a base 30 provided with a downwardly extending hollow shaft 32. Fast to the hollow shaft 32 is a gear 34 that meshes with a gear 36 which is driven from any suitable source of power such, for example, as a pair of beveled gears 38. The partially twisted paper is led from the die 20 upwardly through the hollow shaft 32 and then over a pulley 40 to two small capstans 42 from one of which it passes about a pulley 44 on the base 30 and thence upwardly about an idler 46 to the spool 24. The idler 46 is carried by a vertically reciprocating traveler 48. The capstans 42 are mounted on shafts 50 on which are fast gears 52 that mesh with an idler gear 54 which is secured to a gear 56. The gear 56 meshes with a gear 58 preferably driven by a pair of beveled gears 60. It will be understood that the plate 28 which frictionally engages the plate 26 is geared to the shafts 50 so that the spool 24 is rotated to wind up the twisted paper fed to it by the capstans 42, and that the base 30 is rotated at such a velocity relatively to the rotation of the capstans that the paper is given the desired twist as it is fed along by the capstans. As fully disclosed in the said prior Letters Patent, after the paper has been twisted by the mechanism above described, a supplemental twist may be imparted to it, if desired, to render it more uniform in cross-section by mechanism substantially like that of Fig. 2 except that the gear ratios are such as to produce a twist of a much smaller number of turns to the foot. Fig. 6 illustrates the twisted paper of approximately cylindrical form thus produced.

For purposes of the present invention, in accordance with the illustrated practice, the twisted paper 10 is next condensed or reduced to size and hardened. This step in the novel method, as herein illustrated, is carried out by the use of a rotary swaging machine of the well-known "Torrington" type used heretofore in the manufacture of needles, awls and like articles, the machine being provided with reducing dies 60, 62 (Figs. 3 and 4) for acting upon the twisted paper as it is passed between them, the dies being rotated rapidly about the longitudinal axis of the twisted paper and being also reciprocated rapidly to impart a large number of blows to the twisted paper to reduce it to size and to harden it. The machine comprises a base 64 which supports a fixed sleeve 65 in which there is rotatably mounted a hollow shaft 66 having formed thereon at one end a circular head 68 provided with a groove 70 extending at right angles to the axis of the shaft and in which the dies 60, 62 are fitted to slide. The sleeve 65 has formed thereon a head 67 which is bored to receive a hardened steel ring 72 within which there is rotatably mounted a cage 74 carrying a plurality of steel rolls 76. Extending between the rolls 76 and each die 60, 62 is a hammer 78 from which projects a pin 80 that extends into an elongated slot 82 in a cover plate 84 which is secured to the front face of the head 68 by screws 86 (Fig. 4) and is provided with a central opening 88 for the twisted paper 10. For rotating the shaft 66 there is provided a pulley 90 (Fig. 3) keyed to the shaft and driven by means of a belt (not shown) from any convenient source of power, a loose pulley 92 being provided to which the belt may be shifted when it is desired to disconnect the shaft 66 from the source of power.

The cage 74 is recessed to receive a plurality of pairs of rolls 76, the rolls of each pair being opposite to each other so that, as the shaft 66 and the head 68 are rotated, the rolls of each pair act simultaneously on the hammers 78. The rolls 76 are held against endwise movement in the cage 74 by a cover plate 79 secured to the front face of the head 67 on the fixed sleeve 65 by screws (not shown). It will be understood that, as the shaft 66 is rotated rapidly by power, centrifugal force will cause the dies 60, 62 and the hammers 78 to move outwardly away from the axis of rotation and that as the hammers 78 are engaged by each pair of rolls 76, the hammers and the dies will be moved toward the axis of rotation to cause the dies to impart hammer blows to the twisted paper, the construction being preferably such that, as the hammers 78 pass each pair of rolls 76, the contacting faces 89 of the dies are brought into engagement with each other. As shown particularly in Fig. 4, the contacting faces 89 of the dies 60, 62 are each provided with a semicylindrical recess 94, the recess 94 forming, when the contacting faces of the dies are in engagement with each other, an opening of less diameter than the diameter of the twisted paper before it is presented to the machine. The recesses 94 are tapered slightly at their receiving ends to facilitate the insertion of the twisted paper between the dies. As the twisted paper is fed slowly past the dies 60, 62, it receives a plurality of hammer blows during each rotation of the shaft 66, the dies 60, 62 assuming different angular positions relatively to the longitudinal axis of the twisted paper while delivering the successive blows, thereby insuring the production of fastening material of predetermined diameter and uniform cross-section. The twisted paper may be fed from the spool 24 to the dies 60, 62 from which it passes through the hollow shaft 66 to a reel such as the reel 96 shown in Fig. 5. At the time the twisted paper is subjected to the condensing or compressing action of the dies 60, 62, it will preferably have been allowed to stand long enough to become thoroughly dry and hard, although, if desired, it may be presented to the dies in a somewhat mellow or tempered condition. In order that the finely powdered sizing or glue produced as a result of the hammer action of the dies 60, 62 on the dry twisted paper will not gather on the contacting faces of the dies and thus prevent them from operating in the desired manner, each die is provided with substantially V-shaped grooves 98 in its contacting face parallel to the recesses 94 to receive the powdered glue.

After the paper fastening material has been shaped, condensed and hardened by the action of the dies 60, 62 thereon, it is unwound from the reel 96 and is passed through a bath of sizing 100, for example glue, such as is shown in the previously mentioned Letters Patent, the fastening material being forced beneath the surface of the sizing by a roll 102. Any surplus sizing is removed from the surface of the fastening material by passing it through a stripper die 104 from which the surplus sizing returns to the bath 100. After the bath of sizing 100 the fastening material is dried by passing it through a drier 106 illustrated as a metal box heated by a steam pipe 108. The fastening material is passed back and forth through the box and is protected from coming into direct contact with the heated pipe 108 by means of a baffle plate 110. From the drier 106 the fastening material is wound upon a spool 112. Fig. 7 shows the paper fastening material after it has been shaped and hardened and a surface coating of glue has been applied to it. If desired, the hardened material may be used without any surface coating or sizing, or a thicker coat of sizing may be applied by passing it again through the bath of sizing 100 and the drier 106.

From the foregoing description it will be evident that paper fastening material manufactured in accordance with the method of this invention will be not only harder than any heretofore made but will be uniform in cross-section and accurate as to size. As a result of the twisting operation, the fastening material is formed approximately uniform in cross-section, the twisting compacting the material somewhat thus making it relatively hard and stiff. By subjecting this twisted material to the further compacting and compressing action of the dies 60, 62, its cross-section may be condensed or reduced as much as 30 to 40%, or even more, without displacing the material in the direction of its length. Such fastening material will, of course, be uniform in cross-section and its hardness will depend, in part, upon the width of the strip of paper used to make it, that is, on the amount of paper in the finished product. In order to insure maximum hardness, the width of the strip of paper from which the fastening material is formed will be such as to insure that the final product will be of solid condensed material. The fastening material thus produced will have a smooth and polished skin and is of superior quality for many uses such, for example, as material from which to make fastenings for securing together shoe parts, as disclosed in the previously mentioned Letters Patent No. 1,729,169. In severing from a continuous strip of such fastening material portions which serve as fastenings, it has been found that the fastening material, because of its density and hardness, has less tendency to shred than any heretofore produced. Fastenings, accordingly, may be made of more uniform length than heretofore, and if the ends of such fastenings are exposed in the finished shoe, they will have a greater resistance to wear. Moreover, it has been found that by reason of their greater hardness and stiffness such fastenings may be used in longer lengths than heretofore, without any appreciable tendency to bend in the driving operation, and that they may be driven into fastening-receiving holes of much less diameter than the diameter of the fastenings, thus insuring a tight fit with a resultant maximum holding power.

It might be pointed out for the sake of clearness that in the foregoing description and in the claims, the terms "swaged," "condensed" and similar words in the form of past participles are, when used before a noun, used and intended as gerundives or verbal adjectives which describe, explain or otherwise define and point out the structure, properties or characteristics of the article denoted by the noun. When used as indicated, therefore, these words should not be construed as having reference or being limited to the method or process by which the article was made because, in the use intended, these words define structure or qualities of the article that could be made or produced by more than one process and in some instances by several processes.

Having thus described my invention, what I claim as new and desire to secure by Letters Patent of the United States is:

1. That improvement in methods of manufacturing felted, fibrous fastening material which consists in producing the material in twisted form and subjecting it to a rapid succession of hammer blows to reduce it to the desired shape and to harden the material, applying a surface coating of sizing to the hardened material, and then removing any surplus sizing from the surface of the material before the glue hardens.

2. That improvement in methods of manufacturing fiber fastening material which comprises twisting a strip of paper impregnated with glue and drawing it through a die, allowing the twisted paper to dry, and then subjecting it to the compressive action of a pair of rapidly reciprocating and rotating dies to reduce it to the desired size and to harden it.

3. That improvement in methods of manufacturing paper fastening material which comprises twisting a strip of sized paper, allowing the twisted paper to dry, passing the twisted paper between a pair of rapidly reciprocating and rotating dies to reduce it to the desired size and to harden it, applying a surface coating of sizing to the paper fastening material, and then drying the paper fastening material.

4. That improvement in methods of manufacturing paper fastening material which consists in applying sizing to a strip of paper, passing the strip through a die and twisting it into approximately cylindrical form, allowing the twisted paper to dry, and then swaging the twisted paper to reduce it to the desired size and to harden it without increasing its length.

5. As a new article of manufacture, a product prepared in accordance with the method of claim 4.

6. As a new article of manufacture, a product prepared in accordance with the method of claim 3.

7. As a new article of manufacture, a product prepared in accordance with the method of claim 1.

ALEX HAYNER.